June 3, 1941. C. F. HOTCHKISS, JR 2,243,960
FLEXIBLE DRIVE SHAFT COUPLING
Filed Feb. 4, 1938

Inventor
Clarence F. Hotchkiss Jr.
By Philip S. Hopkins
Attorney

Patented June 3, 1941

2,243,960

UNITED STATES PATENT OFFICE 2,243,960

FLEXIBLE DRIVE SHAFT COUPLING

Clarence F. Hotchkiss, Jr., Binghamton, N. Y.

Application February 4, 1938, Serial No. 188,753

4 Claims. (Cl. 64—4)

This invention relates to flexible drive shafts and more particularly to an improved coupling for drive shafts.

A primary object of this invention is the provision of an improved coupling which forms a relatively small rigid portion of the drive shaft in order that the shaft may be guided around a relatively sharp angular corner.

An additional object is the provision of a unitary coupling wherein a portion of the coupling of the outer covering sheath serves as a bearing for the inner rotating drive shaft.

An additional object is the provision of a coupling wherein the inner drive shaft core may be displaced longitudinally with respect to the outer sheath to permit an exceptional radius of curvature of the shaft adjacent the coupling.

A still further specific object is the provision of an improved coupling for flexible drive shafts wherein there is provided, within the coupling itself, a recess permitting a longitudinal displacement of the inner drive shaft core with respect to the outer covering sheath whereby the shaft may be accommodated to relatively sharp angular bends.

A still further object is the provision of an improved coupling comprising a minimum of readily manufactured, easily assembled parts which is durable in construction, reliable in operation and relatively simple of assembly.

Other objects will in part be obvious and in part be pointed out hereinafter.

Figure 1:
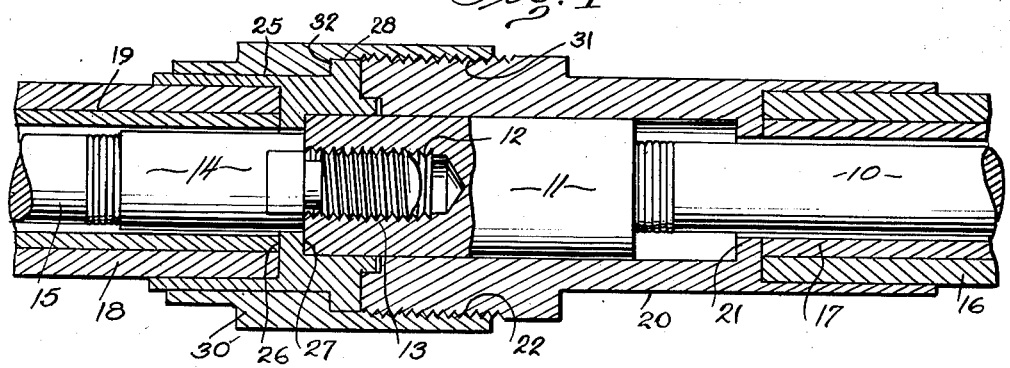
Figure 2:
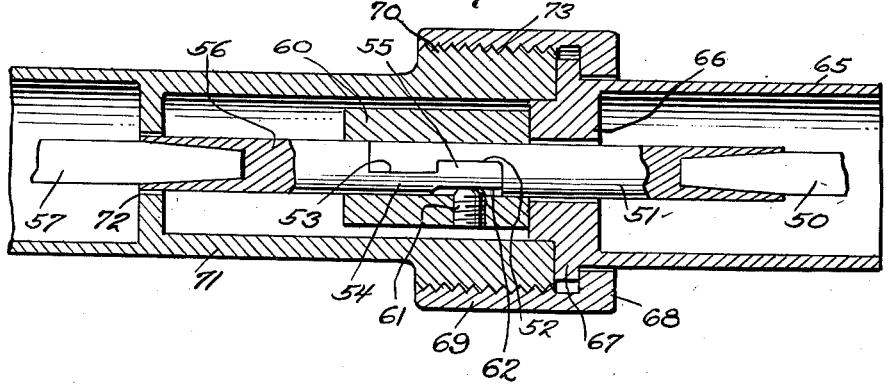

The invention accordingly consists in the combinations of elements, arrangements of parts and features of construction all as will be more fully pointed out hereinafter and disclosed in the accompanying drawing wherein:

Figure 1 is a side sectional view of one form of coupling embodying the principles of this invention, and Figure 2 is a side sectional view of a modified form of coupling.

Having particular reference now to the modification disclosed in Figure 1 there is shown at 10 one segment of a conventional flexible drive shaft core which may be of any desired conventional construction as a helix of relatively fine wire. Shaft 10 is secured in any desired manner as by soldering to a member 11 which is comprised of steel or any other relatively hard metal. Member 11 is provided at its opposite end with a female threaded aperture 12 adapted to accommodate a threaded male member 13 secured in any desired manner to a fitting 14 which in turn is secured in a suitable manner to a section of a flexible drive shaft core 15 corresponding to core 10. Thus the connection of the interior or drive shaft core will be readily understood. Surrounding drive shaft core 10 is a flexible sheath 16 which may be of rubber or similar resilient material provided with a lining 17. A similar sheath 18 having a lining 19 surrounds drive shaft core 15.

It will be understood that in a flexible drive shaft a plurality of the couplings comprising the instant invention may, if desired, be utilized and the distance between said couplings determined by convenience. It will similarly be understood that at the opposite end of core 10 there may be a coupling member similar to that described in connection with core 15 and correspondingly at the opposite end of core 15 there may be a coupling similar to that described in connection with core 10.

Suitably secured to sheath 16 in any desired manner is a rigid metallic member 20 provided with an interiorly disposed annulus 21. Annulus 21 serves as a guide for core 10 to maintain the same centered with respect to sheath 17. Member 20 is preferably comprised of brass or bronze or similar relatively soft metal and, adjacent the extremity thereof, is exteriorly threaded as indicated at 22. The interior dimension of member 20 is slightly greater than the exterior dimension of member 11 whereby when the parts are in assembled relation the interior brass or bronze surface forms a bearing in which steel member 11 rotates. Secured to sleeve 18, in any desired manner, is a collar 25 comprised of any desired material and provided with an interiorly disposed annulus 26 which provides a guide for the centering of fitting 14 and hence shaft 15. The inner face 27 of annulus 26 forms an abutment for the extremity of member 11. An exteriorly disposed annulus 28 carried by collar 25 serves to retain, in slidable relation an exteriorly disposed ring 30 provided with threads 31 adapted for engagement with threads 22 of member 20.

Thus from the foregoing it will be seen that in assembling the device member 13 is first threadedly engaged with recess 12 which positions collar 25 and member 20 in abutting relationship, ring 30 being slidable with respect to collar 25 in order that the same may be out of the way during such preliminary assembly. Ring 30 is then moved towards member 20 and by interengagement of threads 31 and 22 secured thereto until the abutment of annulus 28 with a shoulder 32 carried by ring 30 precludes further tightening thereof. Thus drive shafts 10 and 15, securely connected, are free to rotate within sleeves 16 and 18 and member 20 and collar 26 which, it will be seen, are comprised of a minimum of parts permitting a relatively small lengthwise dimension of the coupling. Member 20 further serves as a bearing within which the coupling of drive shaft cores 10 and 15 may rotate freely and without binding whereby the necessity for separate bearings and an additional number of parts for the coupling is obviated.

It may here be pointed out the distance between the abutting extremity of member 20 and annulus 21 is substantially greater than the length of member 11 and that since movement of member 11 is restricted by its abutment at one end with annulus 26 and at the other with annulus 21 a substantial longitudinal movement thereof is permitted. Thus the inner drive shaft core may move longitudinally within the coupling with respect to the outer sheath when the parts are in related assembly to permit the accommodation of the component parts of the shaft to a relatively sharp radius of curvature without undue strain upon any of the associated mechanisms.

The construction shown in Figure 2 is similar to that shown in Figure 1 in essentials but provides a bayonet coupling of the interior drive shaft core whereby the same may be rotated in either direction rather than in only one direction as is the case with the threadedly connected interior drive shaft of the type disclosed in Figure 1.

In Figure 2 there is disclosed a flexible drive shaft core 50 similar to drive shaft core 10 secured, in any desired manner, to an end member 51 provided with a groove 52 and an extending member 53 positioned for engagement with a corresponding groove 54 and extending member 55 carried by a member 56 secured in any desired manner to a corresponding drive shaft core 57. In assembly, grooves 52 and 54 are slidably engaged with extending portions 53 and 55 and a collar 60 which may slide with respect to members 51 and 56 then slid over the interengaging parts and secured in position as by means of a set screw 61 which engages a flattened surface 62, which may be carried by either member 56 or 51, but in the illustrative embodiment shown is carried by member 56. Surrounding drive shaft 50 is a collar 65 to which is secured, in any desired manner, a flexible sheath (not shown) similar to sheath 17. Member 65 is preferably comprised of brass or bronze and is provided with an interiorly relatively thick annulus 66 which provides a bearing surface for the rotation of member 51. A thinner and outwardly extending flange 67 serves, by its abutment with an inwardly extending flange 68, to retain a ring 69, threaded as at 70. A member 71 surrounds drive shaft core 57 and has secured thereto, in any desired manner, a flexible sheath (not shown) similar to sheath 18. An interiorly positioned annulus 72 serves as a guide for member 56. Member 71 may likewise be comprised of brass or bronze and is of a diameter slightly greater than the external diameter of collar 60 whereby to provide a bearing surface for the same to permit ready rotation of the drive shaft within the coupling and obviate the necessity for separate bearings. Member 71 is provided with a threaded portion 73 for engagement with threads 70 of ring 69.

Thus it will be seen that when the drive shafts 50 and 57 are connected in the manner previously described members 65 and 71 are positioned in relatively tight relation and that ring 69 may be secured to member 71 by the threaded engagement of threads 70 and 73 to form a relatively tight connection.

In connection likewise with the modification it will be seen the longitudinal motion of sleeve 60 is limited at one end by annulus 72 and at the other by annulus 66. However, the distance between annulus 66 and 72 is substantially greater than the length of sleeve 60 and a limited play is therefor provided for the interior drive shaft core with respect to the outer sheath.

It will further be seen that in this modification of the invention there is also provided a coupling comprised of a minimum of parts which requires only a small amount of space permitting a flexible drive shaft having one or more of such couplings to be forced through a pipe of similar device having a plurality of relatively sharp angular bends therein. It will be seen that in this modification the necessity for separate bearings in association with the mechanism is obviated, since the inner surface of members 65 and 71 serve the purpose of bearings in an efficient manner.

If desired it will, of course, be understood that a substantial clearance may be provided between the outer sheath coupling of either modification and the interior drive shaft core connecting members 11 and 60 whereby a substantially floating connection which permits radial as well as longitudinal movement is provided. In such case the integral bearing construction which comprises one element of this invention is eliminated but the relative longitudinal movement of the core with respect to the sheath is retained.

Thus it will be seen that there are herein provided two modifications of the inventive concept which accomplish all the objects of this invention including many advantages of great practical utility especially with respect to simplicity of assembly, reliability of operation and provision of a coupling of relatively short length embodying a minimum of parts.

As many embodiments may be made of this inventive concept and as many modifications may be made of the embodiments herein shown and described it is to be understood that all matter hereinbefore set forth or shown in the accompanying drawing is to be interpreted merely as illustrative and not in a limiting sense.

I claim as my invention:

1. In combination with a flexible drive shaft including an outer flexible sheath, a coupling comprising means for securing the adjacent ends of said inner shaft, and means for securing the adjacent ends of said sheath, the last mentioned means comprising two sleeves each attached to one of said ends one having an annulus and the other having an exterior threaded portion and both of said sleeves having inwardly extending means to provide an elongated open ended chamber through which said shaft passes and adapted to house securing means, and a threaded collar retained on the first mentioned sleeve by the annulus and adapted to threadedly engage the threaded portion of the last mentioned sleeve, said means for securing adjacent ends of the inner shaft being carried in assembled relation within said chamber and adapted for longitudinal movement therein between said inwardly extending means.

2. In combination with a flexible drive shaft including an inner flexible shaft and an outer flexible sheath, a coupling comprising threaded means for securing the adjacent ends of said inner shaft and means for securing the adjacent ends of said sheath, the last mentioned means comprising two sleeves each attached to one of said ends, one having an annulus, and the other having an exterior threaded portion and both of said sleeves having inwardly extending means to provide an elongated open ended chamber through which said shaft passes and adapted to house securing means, and a threaded collar retained on the first mentioned sleeve by the annulus and adapted to threadedly engage the threaded portion of the last mentioned sleeve, the inner periphery of said last mentioned sleeve forming a bearing surface in which said threaded means for securing adjacent ends of the inner shaft is adapted to rotate, said threaded means being carried in assembled relation within said chamber and adapted for longitudinal movement therein and between said inwardly extending means.

3. In combination with a sectional drive shaft including a flexible shaft and an outer, flexible sheath, a coupling comprising means for securing adjacent ends of said inner shaft including a cylindrical member, and means for securing the adjacent ends of said sheath, said means comprising two sleeves each secured to one of said ends, one of said sleeves being provided with an annulus and the other with an exterior threaded portion and both of said sleeves having inwardly extending means to provide an elongated open-ended chamber through which said shaft passes and adapted to house securing means, and a threaded collar retained on the first mentioned sleeve by the annulus and adapted to threadedly engage the threaded portion of said other sleeve, the inner periphery of said last mentioned sleeve forming a bearing surface in which said means for securing adjacent ends of the inner flexible shaft may rotate, said means being carried in assembled relation within said chamber and adapted for longitudinal movement therein between said inwardly extending means.

4. In combination with a flexible drive shaft including an inner flexible shaft and an outer flexible sheath, a coupling comprising means for securing adjacent ends of said inner shaft and means for securing adjacent ends of said sheath, said first mentioned means comprising a member attached to one end of said inner shaft and having a threaded aperture therein, and a unit attached to the other end of said inner shaft and having secured thereto a threaded member adapted to threadedly engage said first member, said means for securing the adjacent ends of the outer flexible sheath comprising two sleeves each attached to one of said ends one having an annulus and the other having an exterior threaded portion and both of said sleeves having inwardly extending means to provide an elongated open-ended chamber through which said shaft passes and adapted to house securing means, and a threaded collar retained on said first mentioned sleeve by the annulus and adapted to threadedly engage the threaded portion of said other sleeve, the inner periphery of said last mentioned sleeve forming a bearing surface in which said means for securing adjacent ends of the inner flexible shaft may rotate, said means being carried in assembled relation within said chamber and adapted for longitudinal movement therein between said inwardly extending means.

CLARENCE F. HOTCHKISS, Jr.